US008849436B2

(12) United States Patent
Kamihara et al.

(10) Patent No.: US 8,849,436 B2
(45) Date of Patent: Sep. 30, 2014

(54) SYSTEM FOR CONTROLLING A MIXER VIA EXTERNAL CONTROLLER

(75) Inventors: Masanori Kamihara, Hamamatsu (JP); Toru Kitayama, Hamamatsu (JP); Mitsunori Ochi, Hamamatsu (JP); Masato Esashi, Hamamatsu (JP); Takahiro Akabane, Hamamatsu (JP)

(73) Assignee: Yamaha Corporation (JP)

( * ) Notice: Subject to any disclaimer, the term of this patent is extended or adjusted under 35 U.S.C. 154(b) by 155 days.

(21) Appl. No.: 13/432,180

(22) Filed: Mar. 28, 2012

(65) Prior Publication Data

US 2013/0060364 A1 Mar. 7, 2013

(30) Foreign Application Priority Data

Mar. 28, 2011 (JP) ................................ 2011-069816

(51) Int. Cl.
*G06F 17/00* (2006.01)
*H04H 60/04* (2008.01)

(52) U.S. Cl.
CPC .................................... *H04H 60/04* (2013.01)
USPC ............................................................ 700/94

(58) Field of Classification Search
USPC ................................. 700/94; 381/119; 369/4
See application file for complete search history.

(56) References Cited

PUBLICATIONS

Yamaha Corporation; "CC121 Advanced Integration Controller"; Operation Manual; pp. 1-29; 2008; http://www.steinberg.net.
Euphonix, Inc.; "MC Control professional control surface" User Guide; pp. 1-68.
Notification of the First Office Action Issued in corresponding Chinese Patent Application No. 201210086714.X, dated Jun. 4, 2014, English translation provided.
Euphonix "MC Mix professional control surface" Users Guide, 2008, 52 pages, Document Revision:D, Euphonix, Inc. 220 Portage Ave, Palo Alto CA 94306 USA.
Extended European Search Report issued in corresponding European patent Application No. 12161750.0 dated Apr. 24, 2014.

*Primary Examiner* — Andrew C Flanders
(74) *Attorney, Agent, or Firm* — Rossi, Kimms & McDowell LLP

(57) ABSTRACT

A system includes at least one controller device connectable to a computer where a mixer function is implemented by application software. The controller device includes: a communication interface connectable to the computer; a plurality of faders capable of remote-controlling parameters of channels assigned thereto; a channel shift button; and a bank shift button. The channels assigned to the faders are collectively shifted by one channel in response to an instruction given via the channel shift button, or collectively shifted by the one bank in response to an instruction given via the bank shift button. For each of the controller devices, identification information of the controller device and information of a first channel of all of the assigned channels is stored so that the stored information is used at the time of activation of the software for restoring previous settings stored at the time of last deactivation of the software.

10 Claims, 9 Drawing Sheets

SYSTEM FOR CONTROLLING A MIXER VIA EXTERNAL CONTROLLER

BACKGROUND

The present invention relates to a system in which an external controller is connected to a computer having installed therein an application program, called "DAW" (Digital Audio Workstation) software, for implementing audio processing functions, such as recording and reproduction, effect impartment, mixing etc. of audio signals, and in which the DAW software is remote-controlled via the external controller.

In the field of audio signal processing apparatus using a computer, it has heretofore been known to perform audio processing, such as recording, editing, mixing etc. of performance data, through digital signal processing. The audio signal processing apparatus employs a general-purpose computer, such as a PC (Personal Computer), and various types of hardware devices, such as an audio interface and MIDI (Musical Instrument Digital Interface) interface, necessary for the audio signal processing. Further, an application program for performing audio signal processing functions is installed in the computer. With such arrangements, audio signal processing functions, such as recording and reproduction, effect impartment, mixing etc. of audio signals, are implemented by the computer. Such audio signal processing apparatus are called "digital audio workstations" (DAWs). In the following description, the application program for the computer to perform such DAW functions will be referred to as "DAW software".

The DAW software operating on a PC is well-developed such that even an individual person can easily perform music production by installing the DAW software in the PC. However, along with a recent increase in the number of functions of the DAW software, necessary parameters have increased, so that it has become difficult to manipulate all of the parameters through operation of a mouse alone. Thus, in some cases today, a dedicated external controller for manipulating the DAW software is connected to a PC having the DAW software installed therein so that the DAW software is controlled via the external controller. In such cases, designated parameters of channels set on the DAW software (or controller) can be remote-controlled.

Examples of such techniques are disclosed in:

Euphonix, Inc. MC Control User Guide, pp. 29-49, [online], Internet <http://connect.euphonix.com/documants/MC_Control_User_Guide_rC_Jap.pdf>, and Steinberg Media Technologies GmbH CC121 Operation Manual [online], Internet <ftp://ftp/steinberg.net/Download/Hardware/CC121/CC121_OperationManual_ja.pdf>

Many of the dedicated controllers for manipulating the DAW software are for professional use and high-priced. Although there are also inexpensive controllers for personal use, they have only a small number of physical controls (or operators), and it is difficult to simultaneously manipulate a plurality of parameters and a plurality of tracks by use of such an inexpensive controller. Further, because, in many cases, the PC having the DAW software installed therein is for personal use and other external devices are connected to the PC, the controller does not always stay in a same physical connection state. Therefore, on occasion, there is a need to reset a connection state between the DAW software and the controller. Further, many of the types of controllers are designed on the premise that they are used on a stand-alone basis, and these types of controllers cannot be used simultaneously and in an interlocked fashion.

SUMMARY OF THE INVENTION

In view of the foregoing prior art problems, it is an object of the present invention to provide an improved system which can eliminate a need for resetting a connection state between an external controller (controller device) and application software and which allows a plurality of external controllers (controller devices) to be connected to a computer and to operate in an interlocked fashion.

In order to accomplish the above-mentioned object, the present invention provides an improved system including at least one controller device connectable to a computer where a mixer function is implemented by application software, the controller device comprising: a communication interface connectable to the computer; a plurality of faders each capable of remote-controlling parameters of one of a plurality of channels assigned thereto, the plurality of channels having consecutive channel numbers; a channel shift button operable to give an instruction for collectively shifting, by one channel, the channels assigned to the plurality of faders; and a bank shift button operable to give an instruction for collectively shifting, by one bank, the channels assigned to the plurality of faders, the one bank comprising a number of channels equal to a total number of the plurality of faders, the system comprising a control section which, upon activation of the application software, assigns channels, which are to be mixed by a mixer function, to the plurality of faders in ascending order of channel numbers starting with a predetermined first channel number, and which collectively shifts, by one channel, the channels assigned to the plurality of faders in response to the instruction given via the channel shift button or collectively shifts, by the one bank, the channels assigned to the plurality of faders in response to the instruction given via the bank shift button. When a plurality of the controller devices are connected to the computer, the control section not only assigns the channels to the faders, considering that a single controller device provided with a given number of faders, equal to a product between the total number of the controller devices connected to the computer and the total number of the faders provided in each of the controller devices, is connected to the computer, but also stores controller information including respective identification information of the controller devices connected to the computer and information indicative of a predetermined first channel of all of the channels assigned to the faders.

According to the present invention, the control section handles a plurality of the controller devices connected to the computer as a single controller device provided with a given number of faders, equal to a product between the total number of the controller devices connected to the computer and the total number of the faders provided in each of the controller devices, but also stores the controller information including the respective identification information of the controller devices connected to the computer and information indicative of the predetermined first channel of all of the channels assigned to the faders. Thus, once the application software is activated with a plurality of the controller devices connected to the computer, settings of the channels at the time of last deactivation of the application software can be restored by reading out the stored controller information. Further, because the controller information includes the respective identification information of the controller devices connected to the computer, it is possible to eliminate a need for resetting (setting again) connection states of the controller devices with the application software.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
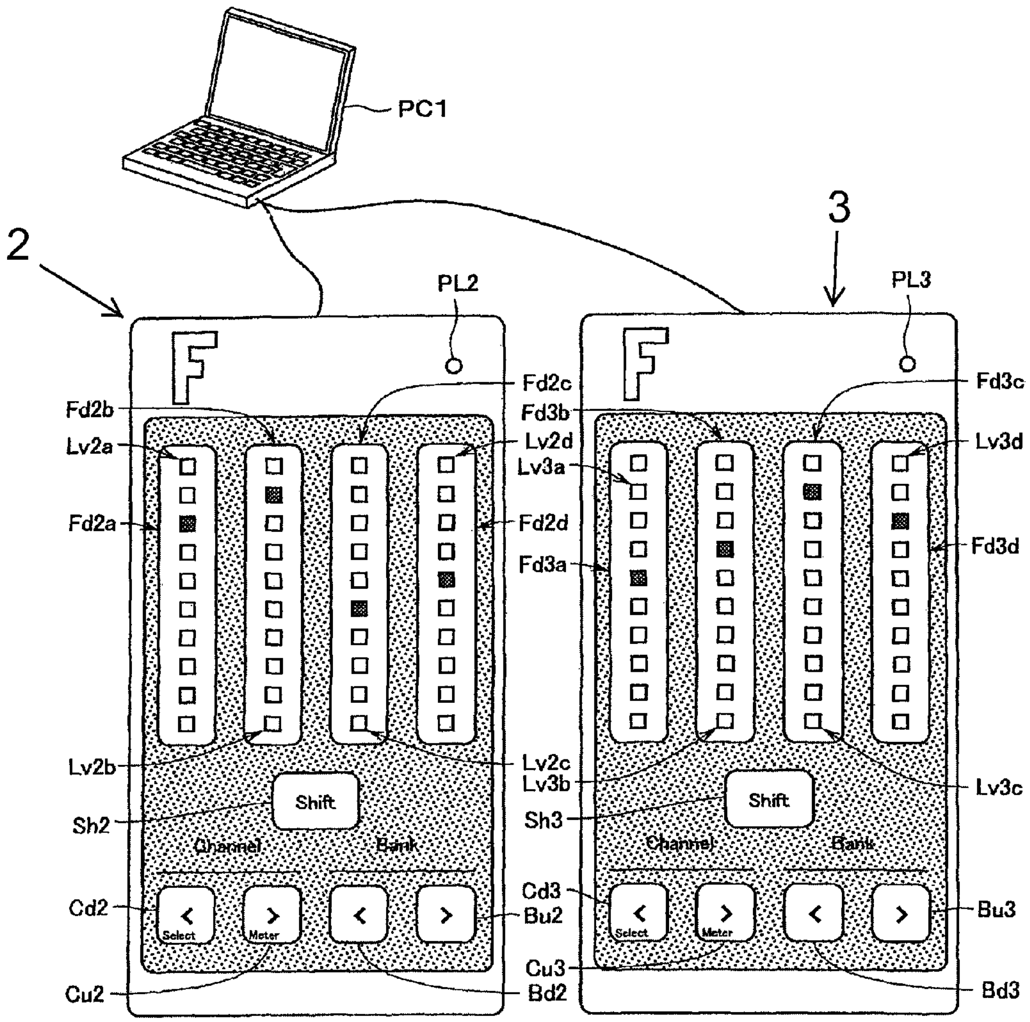
FIG. 1 a diagram showing an embodiment of a system of the present invention where controller devices are connected to a PC.

FIG. 1 shows an embodiment of a system of the present invention where at least one controller device (external remote controller) is connected to a PC (Personal Computer) 1. In FIG. 1, the PC 1 has installed therein DAW (Digital Audio Workstation) software that is application software for implementing audio processing functions, such as recording and reproduction, effect impartment, mixing etc. of audio signals. Two external remote controllers 2 and 3, each of which is a dedicated controller device for manipulating the DAW software, are connected to the PC 1. The PC 1 includes a plurality of USB (Universal Serial Bus) terminals of a USB interface that is one of serial interface standards for interconnecting peripheral devices and a PC, and the external remote controllers 2 and 3 too include USB terminals. The PC 1 and the external remote controllers 2 and 3 are communicatively interconnected via USB cables interconnecting their respective USB terminals. The external remote controllers 2 and 3 can remote-control parameters of individual channels in the DAW software.

Whereas, in the illustrated example of FIG. 1, two external remote controllers 2 and 3 are connected to the PC 1, up to n (e.g., four) external remote controllers are connectable to the PC 1. The external remote controllers 2 and 3 are of a same construction, and thus, the following describe representatively the construction of the external remote controller 2.

As shown in FIG. 1, the external remote controller 2 includes four faders Fd2*a*, Fd2*b*, Fd2*c* and Fd2*d*. Each of the four faders Fd2*a* to Fd2*d* is in the form of a vertically elongated touch panel and is capable of adjusting a fader level of a channel assigned thereto by a human operator or user sliding its finger or the like on and along the touch panel. In each of the faders Fd2*a* to Fd2*d* is incorporated a display section Lv2*a*, Lv2*b*, Lv2*c* or Lv2*d* that comprises a plurality of LEDs disposed at substantially equal intervals along the longitudinal axis of the touch panel. In each of the display sections Lv2*a*-Lv2*d*, one of the LEDs which corresponds to a current position of a fader knob (i.e., fader level) of the channel assigned thereto (i.e., corresponding channel) is lit or illuminated. As the user slides its finger or the like on and along any one of the faders Fd2*a* to Fd2*d*, the position of the corresponding fader knob is moved, so that the LED illuminated in the corresponding display section Lv2*a*-Lv2*d* is moved in accordance with, i.e. in an interlocked relation to, the moved fader knob position. Namely, because the position of the fader knob represents a fader level, the fader level can be adjusted by the user sliding its finger or the like on and along the fader Fd2*a*-Fd2*d*.

Figure 2:
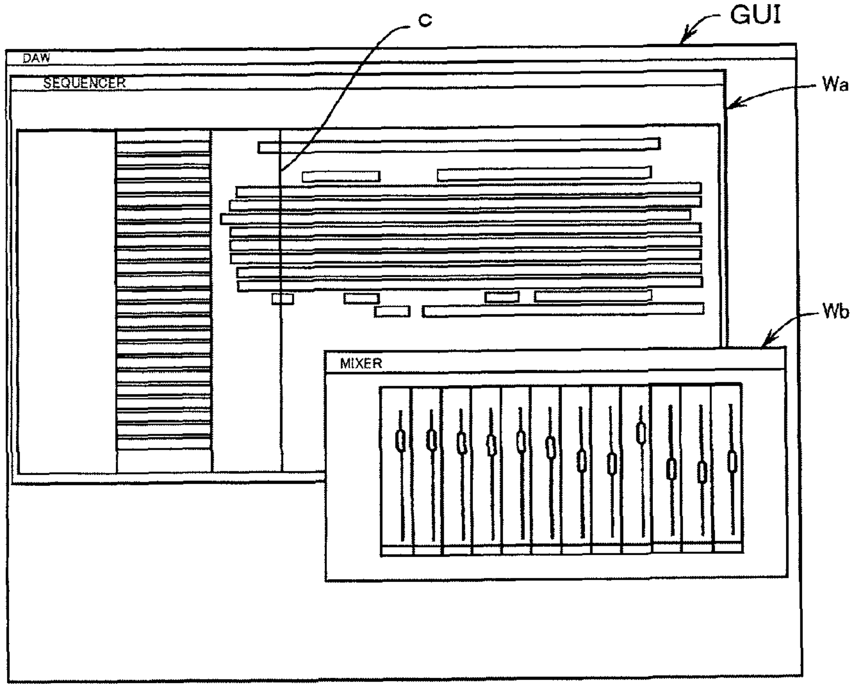
FIG. 2 is a diagram showing a GUI screen of DAW software running on the PC which has the controller devices of the present invention connected thereto.

FIG. 2 shows a GUI (Graphical User Interface) screen of the DAW software displayed on the PC 1 which has the external remote controllers 2 and 3 connected thereto as shown in FIG. 1 and on which the DAW software is running. In the illustrated example of FIG. 2, a window Wa of a sequencer and a window Wb of a mixer are being displayed on the GUI screen of the DAW software. The window Wa is a GUI permitting production of a music piece, on which information of a plurality of tracks of performance data and track-by-track performance data are time-serially displayed in horizontally elongated rectangles. Once a reproduction (play)

button is depressed, a cursor c gradually moves rightward at a speed corresponding to a tempo, during which the performance data of the individual tracks at each cursor position are reproduced. Further, with the DAW software, a mixer function is performed or implemented such that, at the time of reproduction, audio signals of the individual tracks are output after being mixed by the mixer. On the window Wb, which is a GUI of the mixer that mixes audio signals of the individual tracks, are displayed at least the faders of the plurality of channels for adjusting mixing levels of the individual tracks. The user can adjust the mixing levels by moving or dragging the corresponding fader knobs on the screen to thereby adjust fader levels of the channels (tracks) assigned to the faders.

The faders of, for example, twelve channels are being displayed on the window Wb, and the displayed channels, comprising the tracks, can be assigned to the individual faders. As an example, a control section that controls the channel assignment and stores the controlled results is included in the PC 1 (i.e., incorporated as application software).

Positions of the fader knobs can be remote-controlled with the external remote controller 2 in place of the faders displayed on the window Wb. In this case, positions of the fader knobs of channels assigned to the four faders Fd2*a* to Fd2*d* of the external remote controllers 2 are remote-controlled. In this case, four channels of desired increasing or ascending consecutive channel numbers can be assigned to the faders Fd2*a* to Fd2*d* (namely, the four channels can be assigned to the faders Fd2*a* to Fd2*d* in ascending order of the channel numbers); channels of random non-consecutive channel numbers cannot be assigned to the faders Fd2*a* to Fd2*d*. The assigned four channels can be changed by the user depressing a channel shift button provided in a "Channel" section or a bank shift button provided in a "Bank" section of the external remote controller 2 shown in FIG. 1. Namely, if the user depresses a "<" button Cd2, the channels assigned to the faders Fd2*a* to Fd2*d* are shifted by one channel in a channel-No. decreasing or descending direction. For example, if the user depresses the "<" button Cd2 with channels of channel Nos. 3 to 6 (i.e., channels ch3 to ch6) assigned to the faders Fd2*a* to Fd2*d*, then channels ch2 to ch5 are assigned to the faders Fd2*a* to Fd2*d*. If the user depresses the ">" button Cu2 in the "Channel" section, the channels assigned to the faders Fd2*a* to Fd2*d* are shifted by one channel in a channel-No. increasing or ascending direction. For example, if the user depresses the ">" button Cu2 with channels ch3 to ch6 assigned to the faders Fd2*a* to Fd2*d*, then channels ch4 to ch7 are assigned to the faders Fd2*a* to Fd2*d*. Because the channels displayed on the window Wb sequentially increase in channel number in a left-to-right direction, the "<" button Cd2 may be called "leftward channel shift button", while the ">" button Cu2 may be called "rightward channel shift button".

Further, if the user depresses a "<" button Bd2 in the "Bank" section, the channels assigned to the faders Fd2*a* to Fd2*d* are shifted by one bank (in this case, four channels) in the channel-No. decreasing or descending direction. For example, if the user depresses the "<" button Bd2 with channels ch6 to ch9 assigned to the faders Fd2*a* to Fd2*d*, then channels ch2 to ch5 are assigned to the faders Fd2*a* to Fd2*d*. If the user depresses the ">" button Bu2 in the "Bank" section, the channels assigned to the faders Fd2*a* to Fd2*d* are shifted by one bank (four channels) in the channel-No. increasing or descending direction. For example, if the user depresses the ">" button Bu2 with channels ch6 to ch9 assigned to the faders Fd2*a* to Fd2*d*, then channels ch10 to ch13 are assigned to the faders Fd2*a* to Fd2*d*. Thus, the "<" button Bd2 may be called "leftward bank shift button", while the ">" button Bu2 may be called "rightward bank shift button".

Namely, by the user depressing the channel shift button Cd2 or Cu2 or bank shift button Bd2 or Bu2, four channels of desired consecutive channel numbers can be assigned to the Fd2*a* to Fd2*d*.

As noted above, four channels of desired ascending consecutive channel numbers can be assigned to the faders Fd2*a* to Fd2*d* (namely, the four channels can be assigned to the faders Fd2*a* to Fd2*d* in ascending order of the channel numbers) independently of a channel selected on the window Wb of the PC1. Note, however, that, if the user simultaneously depresses the "<" button Cd2 and a "Shift" button Sh2 of the external remote controller 2, the function of the button Cd2 is switched to a "Select" function so that four channels of desired ascending consecutive channel numbers, starting with the channel currently selected on the window Wb of the PC 1, are assigned to the faders Fd2*a* to Fd2*d*. For example, if channel ch3 is currently selected on the window Wb, channels ch3 to ch6 are assigned to the faders Fd2*a* to Fd2*d*. Further, if the user simultaneously depresses the ">" button Cu2 and the "Shift" button Sh2, the function of the button Cu2 is switched to a "Meter" function (i.e., level meter display function) so that input levels of four channels assigned to the faders Fd2*a* to Fd2*d* are displayed on the corresponding display sections Lv2*a* to Lv2*d*. If the user operates, i.e. slides its forger on, any one of the faders Fd2*a* to Fd2*d* while level meters are displayed in response to the depression of the ">" button Cu2 and the "Shift" button Sh2, the display section of the operated fader displays a position of the fader knob for a given time and then returns back to the level meter display. Note that the above-mentioned level meter display function is in an OFF state when the external remote controller 2 is activated.

The external remote controller 3 has the same functions as the external remote controller 2; namely, the external remote controllers 2 and 3 are constructed to behave in the same manner.

Figure 3:
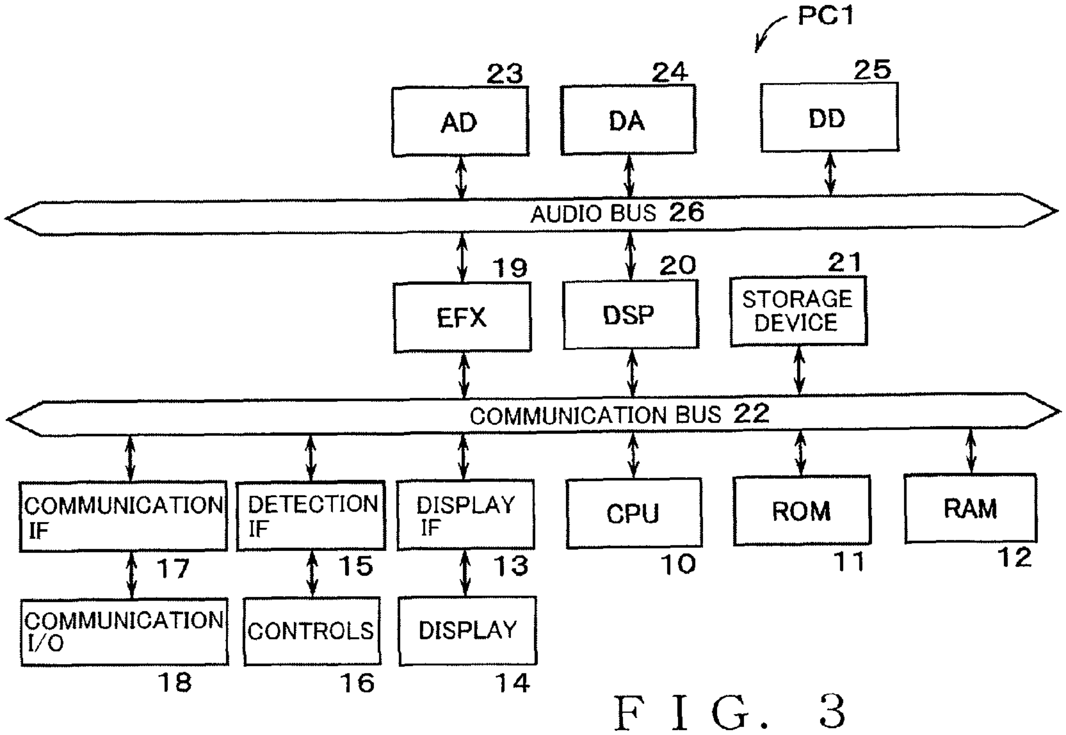
FIG. 3 is a block diagram showing an example hardware setup of the PC to which the controller devices of the present invention are connected.

FIG. 3 is a block diagram showing an example hardware setup of the PC 1 in which the DAW software is installed. As shown in FIG. 3, a CPU (Central Processing Unit) 10 in the PC 1 executes a management program (Operating System or OS) so that general behavior of the PC 1 is controlled by the OS. The PC 1 also includes a non-volatile ROM (Read-Only Memory) 11 in which are stored various programs and various data, and a RAM (Random Access Memory) 11 in which are stored a working area of the CPU 10 and various data. The PC 1 includes a storage device 21 that may be a drive device provided with any of various recording media, such as a hard disk HD, compact disk CD and flexible disk FD, and various applications, such as the DAW software, are stored in the hard disk HD. By executing the DAW software, the PC 1 implements the audio processing functions, such as recording and reproduction, effect impartment, mixing etc. of audio signals, so that desired music production can be readily performed by use of the PC 1.

A display IF 13 is a display interface for displaying, on a display section 14 such as a liquid crystal display, various GUI screens of currently operating applications. A detection IF 15 is an interface for scanning controls (operators) 16, such as switches, provided on the PC 1 to detect operation of any of the controls 16, so that an operation signal corresponding to the operated control 16. A communication IF 17 is a communication interface for performing communication with an external device, such as a controller device, via a communication I/O 18, and the communication IF 17 is, for example, a USB or Ethernet (registered trademark) interface. An effecter (EFX) 19 imparts, under the control of the CPU 10, effects, such as reverberation, echo and chorus, to audio signals having been mixed by the DAW software. Further, under the control of the CPU 10, a DSP 20 performs audio signal processing for mixing input audio signals after adjusting sound volume levels and frequency characteristics of the audio signals on the basis of respective parameters and then controlling audio characteristics, such as sound volume, panning and effect, of the mixed audio signals on the basis of respective parameters. The above-mentioned CPU 10, ROM 11, RAM 12, display IF 13, detection IF 15, communication IF 17, EFX 19, DSP 20 and storage device 21 communicate data with one another via a communication bus 22.

An AD 23 comprises a plurality of analog input ports for inputting analog signals to the PC 1, and the analog signals thus input are converted via the AD 23 into digital signals and then sent to an audio bus 26. A DA 24 comprises a plurality of analog output ports for outputting mixed analog signals from the PC 1, and digital signals received via the audio bus 24 are converted by the DA 24 into audio signals and output from the DA 24. A DD 25 comprises a plurality of input/output ports for not only inputting digital signals to the PC 1 but also outputting mixed digital signals to the outside. Digital input signals input via the DD 25 are sent to the audio bus 26, and digital output signals received via the audio bus 26 are output to a digital recorder or the like. The EFX 19 and the DSP 20 communicate data etc. with the AD 23, DA 24 and DD 25 via the audio bus 26. Note that the digital signals sent from the AD 23 and DD 25 are received by the DSP 20 so that the aforementioned digital signal processing is performed by the DSP 20 on the received audio signals.

Whereas hardware of the AD 23, DA24 and DD 25 may be provided in the PC 1, the AD 23, DA24 and DD 25 may be implemented by software in the PC 1. Further, if the CPU 10 is constructed to perform the audio signal processing in place of the DSP 20, the DSP 20 can be dispensed with.

Figure 4:
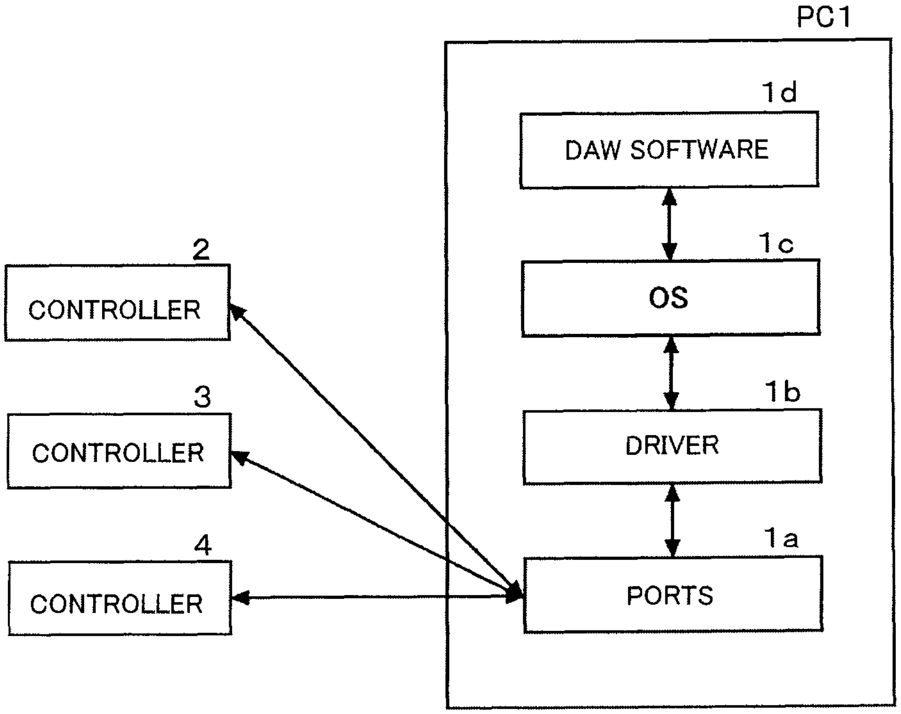
FIG. 4 is a diagram showing a hierarchical structure of the PC having the controller devices of the present invention connected thereto.

FIG. 4 shows a hierarchical structure of the PC to which are connected the external remote controllers according to an embodiment of the invention connected thereto. In the illustrated example of FIG. 4, three external remote controllers 2, 3 and 4 are connected to the PC 1 via USB cables connected to their respective USB terminals. The external remote controllers 2, 3 and 4 are connected to ports 1*a* of different port numbers of the PC 1 under the control of the OS 1*c*. The port numbers depend on a driver 1*b* used, and correspondence relationship between the ports numbers and the external remote controllers 2, 3 and 4 is stored by the OS 1*c*. Further, the external remote controllers 2, 3 and 4 are logically connected to different port names of MIDI ports of the DAW software under the control of the OS 1*c*. Correspondence relationship between the port names and the external remote controllers 2, 3 and 4 is determined and stored by the DAW software. In this way, communication between the DAW software 1*d* and the external remote controllers 2, 3 and 4 can be performed under the control of the OS 1*c*.

When the external remote controllers 2, 3 and 4 have been connected to the PC 1 and the DAW software 1*d* has been activated for the first time, the external remote controllers 2, 3 and 4 are newly registered into the DAW software in order of indexes allocated to the port names of the MIDI ports. The indexes allocated to the port names depend on the driver 1*b* and are, for example, in the form of MAC (Media Access Control) addresses or serial numbers, such as manufacturer's serial numbers, of the external remote controllers 2, 3 and 4 connected to the ports. Also, at the time of initial activation of the DAW software 1*d*, controller IDs are allocated to the external remote controllers 2, 3 and 4, using the indexes of the individual port names, such that each of the external remote controllers 2, 3 and 4 can be uniquely identified. Further, the DAW software manages and stores respective properties of the external remote controllers 2, 3 and 4 registered in the DAW software. The properties include the names of the ports, having the external remote controllers 2, 3 and 4 connected thereto, and the allocated controller IDs.

Figure 5:
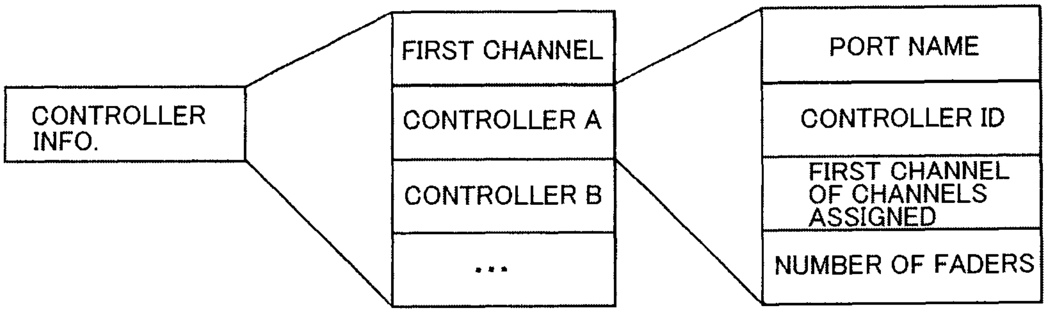
FIG. 5 is a conceptual diagram explanatory of controller information of the controller devices of the present invention.

FIG. 5 is a conceptual diagram explanatory of controller information of the external remote controllers that is stored in the working area of the RAM 12 used by the DAW software. The controller information includes information indicative of a channel number of a first (or leading) one of all of the channels last assigned to the external remote controllers and properties of external remote controllers A, B, . . . registered in the DAW software in the order of the indexes allocated to the port names. The properties of each of the external remote controllers A, B, . . . include the port name of the port, having the external remote controller connected thereto, allocated controller ID, channel number of a first one of the channels assigned to the external remote controller and the (total) number of faders provided in the external remote controller. Note that the properties themselves are retained even after the registered external remote controller is detached or disconnected from the PC 1. Further, the controller information shown in FIG. 5 is stored into the non-volatile storage device 21 when the DAW software has been deactivated, so that it can be read out from the storage device 21 and set into the RAM 12 upon subsequent activation of the DAW software (i.e., next activation of the DAW software following the last deactivation).

By using such controller information when the DAW software is activated next time, the channels last assigned to the external remote controllers can be restored even when the external remote controllers are connected to the port names of MIDI ports different from those which they were connected to last time.

Figure 6:
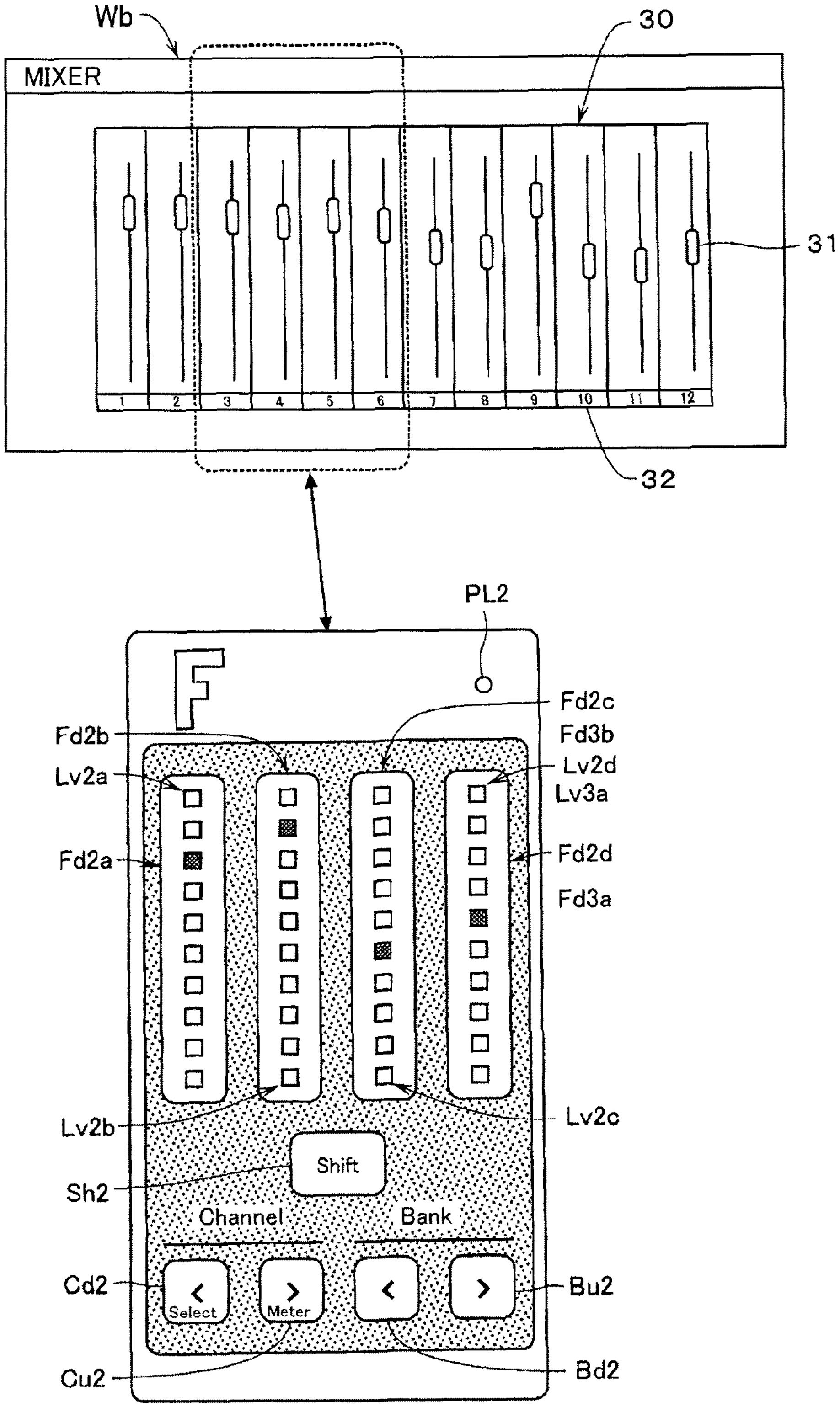
FIG. 6 is a diagram showing a basic form of assignment, to the controller device, of channels.

FIG. 6 shows a basic form of channel assignment to the external remote controller. Upon activation of the DAW software, at least the mixer function is implemented, so that a "mixer" screen is displayed on the window Wb as shown in FIG. 6. On the "mixer" screen are displayed twelve channel faders 30 of channels ch1 to ch12 that sequentially increase in channel number one by one in the left-to-right direction. The external remote controller 2, on the other hand, is provided with four faders Fd2*a* to Fd2*d* to which different channels can be assigned. Let's now consider a case where four channels ch3 to ch6, enclosed by broken line on the window Wb shown in FIG. 6, have been assigned to the faders Fd2*a* to Fd2*d*. In this case, the position of the fader knob of channel ch3 can be remote-controlled to move by the user sliding its finger or the like on the corresponding fader Fd2*a*, and the LED illuminated on the display section Lv2*a* is moved in interlocked relation to the moved (i.e., moved-to) position of the fader knob. The same is true with the other faders Fd2*b*, Fd2*c* and Fd2*d*. Namely, by the user sliding its finger or the like on any one of the faders Fd2*b* to Fd2*d*, the position of the fader knob of channel ch4-ch6 assigned to the fader can be remote-controlled to move, and the LED illuminated on the display section Lv2*b*-Lv2*d* is moved in interlocked relation to the moved-to position of the fader knob.

As the user slides its finger or the like on any one of the faders Fd2*a* to Fd2*d* of the external remote controller 2, the fader knob 31 of the corresponding channel fader 30 displayed on the mixer screen is moved in interlocked relation to the user's sliding operation.

Figure 7:
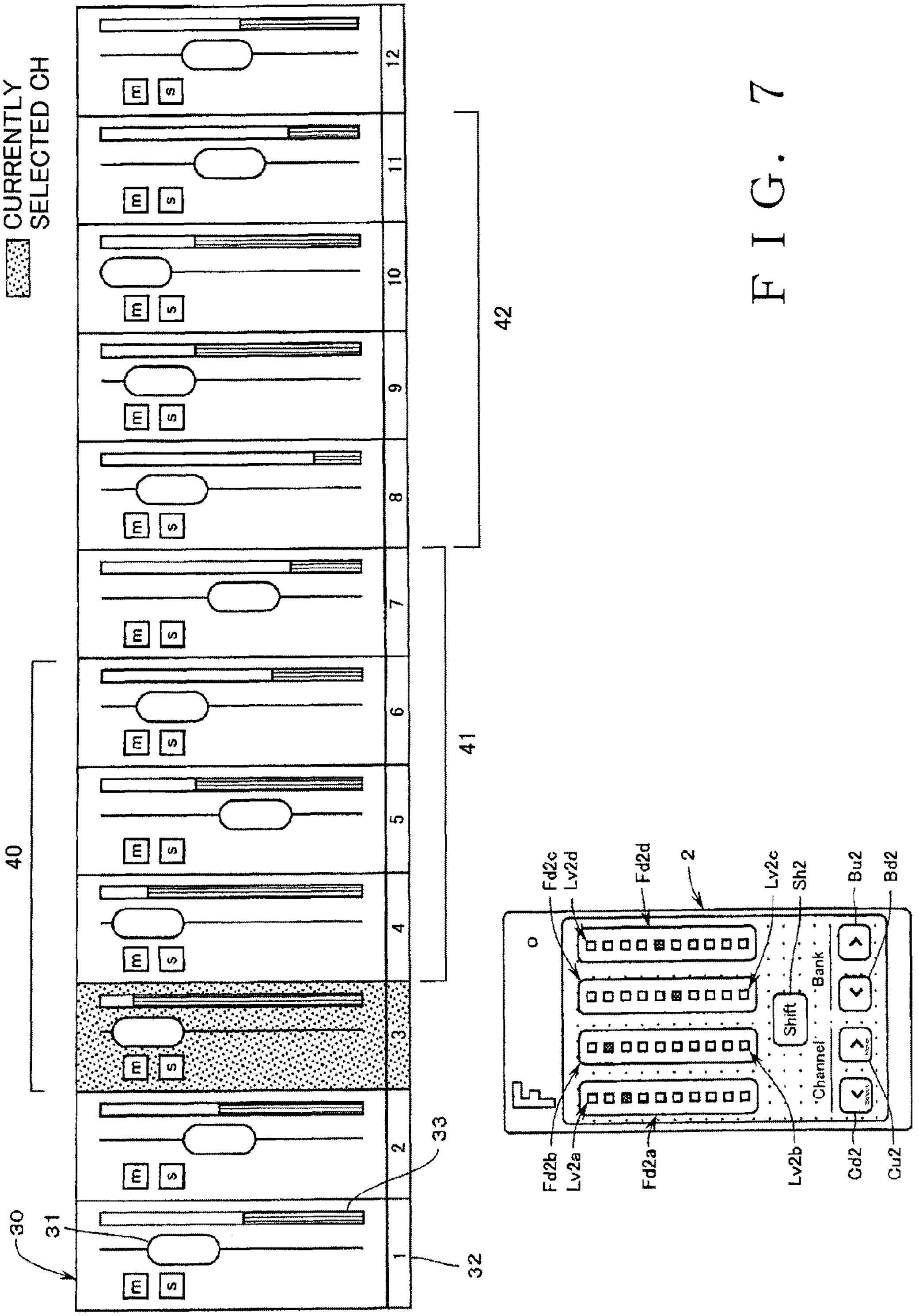
FIG. 7 is a diagram showing an example detailed manner in which channels are assigned to one controller device of the present invention.

The following describe, with reference to FIG. 7, a detailed example manner in which channels are assigned to the external remote controller 2 when the external remote controller 2 is connected to the PC 1. In the illustrated example of FIG. 7, the DAW software is running on the PC 1, and twelve channel faders 30 of channels ch1 to ch12 are displayed on the mixer screen of the window Wb. In this example, just one external remote controller 2 is connected to the PC 1. Each of the channel faders 30 includes the fader knob 31, level meter 33, mute button "m" and solo button "s". By the user dragging or moving the fader knob 31 of the channel fader 30 via a pointing device, the fader level of the channel assigned to the channel fader 30 can be adjusted. Further, an input level of the assigned channel is displayed on the level meter 33, and switching can be made between mute ON and mute OFF states of the channel via the mute button "m". Further, switching can be made between solo ON and solo OFF states of the channel via the solo button "s". Furthermore, the channel number 32 of each of the channel faders 30 is displayed at the bottom of the channel fader 30. Also, in the illustrated example of FIG. 7, the channel fader 30 of channel ch3, whose background is displayed in a gray color, is a currently selected channel fader.

Let it also be assumed here that channels ch3 to ch6 in a "current assigned range 40" are channels currently assigned to the faders Fd2*a* to Fd2*d*. If the user depresses the channel rightward button Cu2 (">") of the external remote controller 2 in a state as indicated by such a current assigned range 40, the channels assigned to the faders Fd2*a* to Fd2*d* are shifted by one channel in the rightward direction, as a result of which channels ch4 to ch7 are assigned to the faders Fd2*a* to Fd2*d* as indicated by a "channel-shifted assigned range 41". If the user depresses the bank rightward button Bu2 (">") of the external remote controller 2 in a state as indicated by the channel-shifted assigned state 41, the channels assigned to the faders Fd2*a* to Fd2*d* are shifted by one bank in the rightward direction, as a result of which channels ch8 to ch11 are assigned to the faders Fd2*a* to Fd2*d* as indicated by a "bank-shifted assigned range 42". In this case, because only one external remote controller 2 is currently connected to the PC 1, one bank has a size of four channels that is equal to the number of the faders provided in the external remote controller 2.

Further, if the user depresses the channel leftward button Cd2 ("<") of the external remote controller 2 in the state as indicated by the current assigned range 40, the channels assigned to the faders Fd2*a* to Fd2*d* are shifted by one channel in the leftward direction, as a result of which channels ch2 to ch5 are assigned to the faders Fd2*a* to Fd2*d*. If the user depresses the bank leftward button Bd2 ("<") of the external remote controller 2 in the state as indicated by the channel-shifted assigned range 41, the channels assigned to the faders Fd2*a* to Fd2*d* are shifted by one bank in the leftward direction. However, in this case, the channels assigned to the faders Fd2*a* to Fd2*d* are shifted by only three channels in the leftward direction because there are only three channels, less than the one bank size, to the left of the channel-shifted assigned state 41, so that channel ch1 that is of the smallest channel number is assigned to the leftmost-end fader Fd2*a* and the channels of ascending consecutive channel numbers ch2 to ch4 are assigned to the faders Fd2*b* to Fd2*d* following the leftmost-end fader Fd2*a*; in the aforementioned manner, channels ch1 to ch4 are assigned to the faders Fd2*a* to Fd2*d*.

Figure 8:
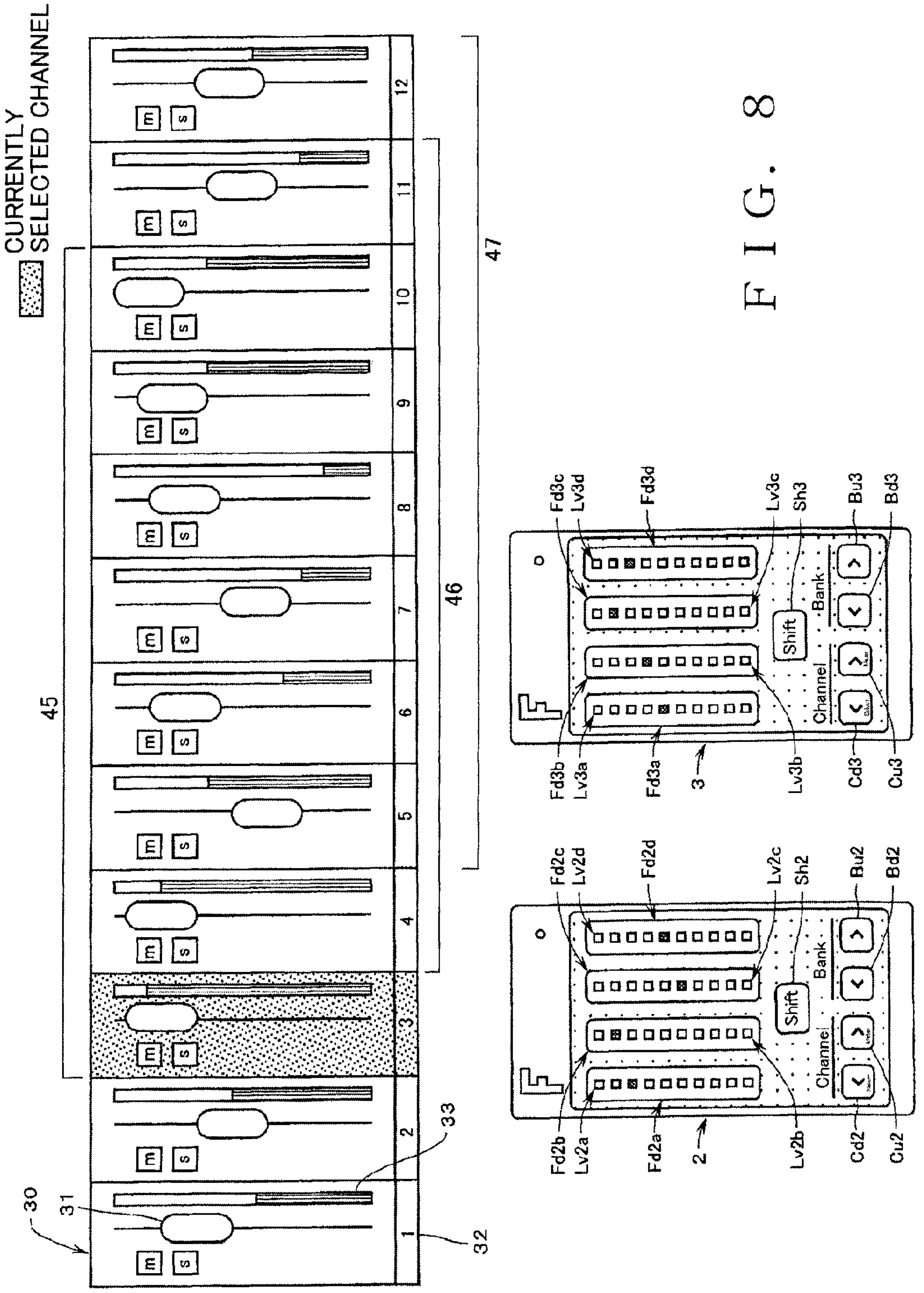
FIG. 8 is a diagram showing an example detailed manner in which channels are assigned to two controller devices of the present invention.

The following describe, with reference to FIG. 8, a detailed manner in which channels are assigned to the external remote controllers 2 and 3 when the two external remote controllers 2 and 3 are connected to the PC 1. In the illustrated example of FIG. 8, the DAW software is running on the PC 1, and twelve channel faders 30 of channels ch1 to ch12 are displayed on the mixer screen of the window Wb. Because the external remote controllers 2 and 3 are connected to the PC 1, one bank size is eight channels that is equal to the total number of the faders provided on the two external remote controllers 2 and 3. Also, in the illustrated example of FIG. 8, the channel fader 30 of channel ch3, whose background is displayed in a gray color, is a currently selected channel fader.

Let it be assumed here that channels ch3 to ch10 in a "current assigned range" 45 are currently assigned to the faders Fd2*a* to Fd2*d* and faders Fd3*a* to Fd3*d*. If the user depresses the channel rightward button Cu2 (">") of the external remote controller 2 or the channel rightward button Cu3 (">") of the external remote controller 3 in a state as indicated by such a current assigned range 45, the channels assigned to the faders Fd2*a* to Fd2*d* and Fd3*a* to Fd3*d* are shifted by one channel in the rightward direction, as a result of which channels ch4 to ch11 are assigned to the faders Fd2*a* to Fd2*d* and Fd3*a* to Fd3*d* as indicated by a "channel-sifted assigned range 46". If the user depresses the bank rightward button Bu2 (">") of the external remote controller 2 or the bank rightward button Bu3 (">") of the external remote controller 3 in a state indicated by the channel-shifted assigned range 46, the channels assigned to the faders Fd2*a* to Fd2*d* and Fd3*a* to Fd3*d* are shifted by one bank, i.e. eight channels, in the rightward direction. Actually, however, because the greatest channel number is "12" and thus there is only one channel, less than one bank size, to the right of the channel-shifted assigned range 46, the channels are shifted by one channel in the rightward direction, as a result of which channel ch12 of the greatest channel number is assigned to the rightmost-end fader Fd3*d* and channels ch11 to ch5 of the preceding descending consecutive channel numbers are assigned to the faders Fd3*c* to Fd3*a* and the faders Fd2*d* to Fd2*a* (namely, channels ch11 to ch5 are assigned to the faders Fd2*a* to Fd2*d* in descending order of the channel numbers) as indicated by a bank-shifted assigned state 47.

Further, if the user depresses the channel leftward button Cd2 ("<") of the external remote controller 2 or the channel leftward button Cd3 ("<") of the external remote controller 3 in the state as indicated by the current assigned range 45, the channels assigned to the faders Fd2*a* to Fd2*d* are shifted by one channel in the leftward direction, as a result of which channels ch2 to ch9 are assigned to the faders Fd2*a* to Fd2*d* and Fd3*a* to Fd3*d*. If the user depresses the bank leftward button Bd2 ("<") of the external remote controller 2 or the bank leftward button Bd3 ("<") of the external remote controller 3 in the state indicated by the channel-shifted assigned state 46, the channels assigned to the faders Fd2*a* to Fd2*d* and Fd3*a* to Fd3*d* are shifted by one bank, i.e. eight channels, in the leftward direction. Actually, however, because the smallest channel number is "1" and there are only three channels, less than one bank size, to the left of the assigned range 46, the channels are shifted by only three channels in the leftward direction, as a result of which channel ch1 of the smallest channel number is assigned to the leftmost-end fader Fd2*a* and channels ch2 to ch8 of the following ascending consecutive channel numbers are assigned to the faders Fd2*b* to Fd2*d* and the faders Fd3*a* to Fd3*d*.

As set forth above, in the case where n external remote controllers are connected to the PC 1, no matter which one of the channel shift buttons and bank shift buttons of the n external remote controllers is operated, all channels assigned to these external remote controllers are shifted in response to the operated channel shift button or bank shift button. However, in a case where the user instructs, through shift button operation, that a shift be effected beyond the channel of the smallest or greatest channel number, a channel shift is effected only up to the channel of the smallest or greatest channel number, i.e. a channel shift beyond the channel of the smallest or greatest channel number is inhibited. Namely, if the assigned range cannot be shifted by the number of channels as instructed through the user's operation of any one of the shift buttons, an exceptional channel assignment process is performed in which a channel shift is effected only up to the channel of the smallest or greatest channel number and then terminated.

Further, in the case where n external remote controllers are connected to the PC 1 and m faders are provided in each of the external remote controllers, the DAW software performs the channel assignment process, regarding or considering the product (n*m) as the number of channels constituting one bank size. Namely, even where n external remote controllers are connected to the PC 1, the DAW software considers that only one external remote controller provided with the (n*m) faders is logically connected to the PC 1.

Figure 9A:
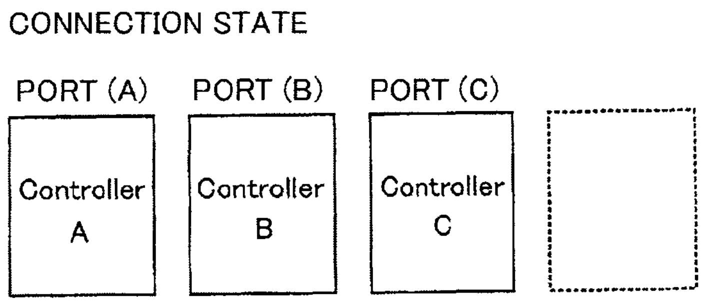
FIGS. 9A and 9B are diagrams showing connection states of a plurality of controller devices of the present invention and channel assignments of the controller devices at the time of first activation of DAW software.
Figure 9B:
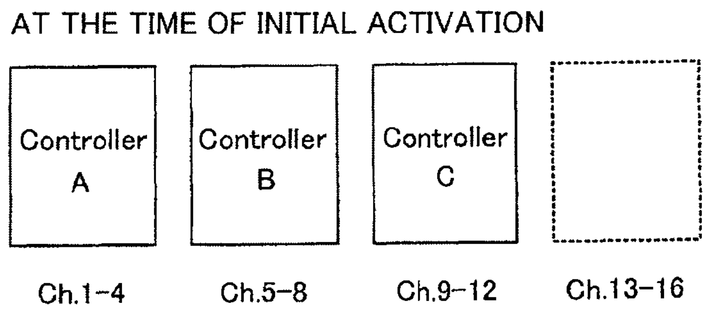

FIG. 9A shows a connection state in which three external remote controllers are connected to the PC 1, and FIG. 9B shows an example manner in which channels are assigned upon initial activation of the DAW software in the connection state of FIG. 9A. Once the DAW software is activated for the first time (i.e., upon initial activation of the DAW software) in the connection state of FIG. 9A, the DAW software determines which external remote controllers are currently connected to which port names of the MIDI ports, and the external remote controllers are newly registered into the DAW software in the order of the indexes of the port names to which the external remote controllers are connected. The indexes are MAC addresses or serial numbers, such as manufacturer's serial numbers, of the external remote controllers connected to the ports of the port names. If the order of the indexes of the port names is "(A)→(B)→(C)", then the three external remote controllers are registered into the DAW software upon the initial activation of the DAW software in the order of the indexes, i.e. "Controller A→Controller B→controller C", as shown in FIG. 9B. Note that the indexes of the port names depend on the driver 1*b*.

Unique controller IDs are allocated, under the control of the DAW software, to the three external remote controllers, Controller A, Controller B and Controller C, newly registered upon the initial activation of the DAW software, and channels are assigned to the external remote controllers in the order of the indexes of the port names starting with the first channel number as indicated in FIG. 9B. Namely, upon the initial activation of the DAW software, channels of ascending consecutive channel numbers, starting with channel ch1 that is the leading or first channel of various channels currently handled in the DAW software, are assigned to the external remote controllers in the order of Controller A→Controller B→Controller C. In the case where the three external remote controllers, Controller A, Controller B and Controller C, are connected to the PC 1 as noted above, the DAW software performs the channel assignment, considering the product (n*m) as the number of channels constituting one bank size. In this case, because each of the external remote controllers has four faders, the DAW software assigns twelve channels ch1 to ch12 (3*4=12) to Controller A, Controller B and controller C logically regarded or considered as a single external remote controller provided with twelve faders.

As a consequence, channels ch1 to ch4 are assigned to Controller A, channels ch5 to ch8 are assigned to Controller B, and channels ch9 to ch12 are assigned to Controller C. Further, in a case where the fourth external remote controller in addition to the first to third external remote controller is connected to the PC 1, the DAW software considers that one logical external remote control provided with sixteen faders is connected to the PC 1, sets sixteen channels as one bank size, and assigns sixteen channels ch1 to ch16, constituting one bank size, to the four external remote controllers. In this case, channels ch13 to ch16 are assigned to the fourth external remote controller.

The controller information to be stored upon the initial activation of the DAW software includes the channel number of the first channel ch1 of all the channels assigned to the external remote controllers, and profiles of Controller A, Controller B and Controller C. The profile of each of Controller A, Controller B and Controller C includes the respective port name, controller ID, channel number of the first channel of the channels assigned to the external remote controller and the number of faders provided in the external remote controller.

Figure 10A:
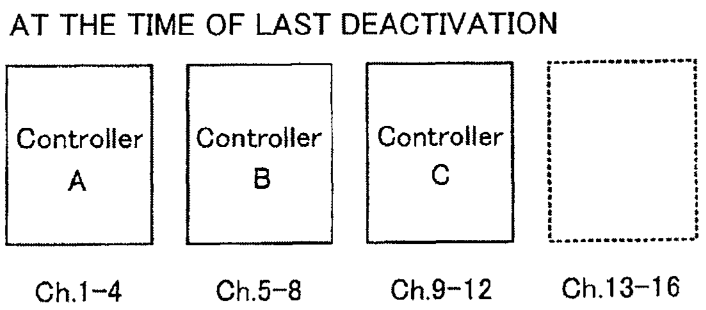
FIGS. 10A and 10B are diagrams showing an example of channel assignments of a plurality of controller devices of the present invention at the time of last deactivation and next activation, following the last deactivation, of the DAW software.
Figure 10B:
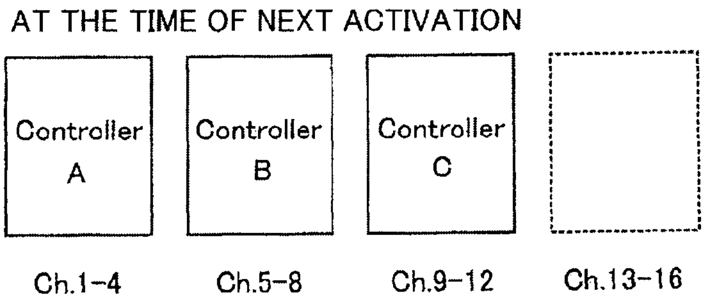

FIG. 10A shows channel assignment to external remote controllers at the time of last deactivation of the DAW software, and FIG. 10B shows channel assignment to external remote controllers at the time of next activation of the DAW software following the last deactivation. Namely, at the time of the last deactivation of the DAW software shown in FIG. 10A, three external remote controllers, Controller A, Controller B and Controller C, were (had been) registered in the DAW software, and channels ch1 to ch4 were assigned to Controller A, channels ch5 to ch8 assigned to Controller B, and channels ch9 to ch12 assigned to Controller C. Also, at the time of the deactivation, the DAW software stores the above-mentioned controller information. Then, once the thus-deactivated DAW software is activated again (i.e., upon the next activation), the DAW software identifies the controller IDs of the external remote controllers, determined to be currently connected to the PC 1, on the basis of the MAC addresses or serial numbers, such as the manufacture's serial numbers, of the external remote controllers. In the illustrated example of FIG. 10B, the controller IDs of Controller A, Controller B and Controller C are identified by the DAW software. Then, the DAW software reads out the stored controller information and determines, on the basis of the controller IDs identified upon the next activation, whether the connected external remote controllers have already been registered in the DAW software and whether the organization (i.e., combination and arrangement) of the connected external remote controllers is the same as that at the time of the last deactivation. In the illustrated example of FIG. 10B, where Controller A, Controller B and Controller C are connected to the PC 1, the DAW software determines that the connected Controller A, Controller B and Controller C have been registered and the organization of the connected controllers is the same as that at the time of the last deactivation. Then, the DAW software performs the channel assignment, considering twelve channels as the number of channels constituting one bank size. Here, because the leading or first channel in the controller information is of channel number ch1, the DAW software assigns twelve channels ch1 to ch12 to Controller A, Controller B and Controller C logically considered as a single external remote controller provided with twelve faders. Namely, channels ch1 to ch4 are assigned to Controller A, channels ch5 to ch8 are assigned to Controller B, and channels ch9 to ch12 are assigned to Controller C, and in this way, the same assignment state as at the time of the last deactivation is restored.

At the time of the next activation, the DAW software determines whether the currently connected external remote controllers are the same as those connected at the time of the last deactivation, on the basis of the controller IDs of the external remote controllers in place of the port names. Thus, even where the port names to which the external remote controllers have been connected at the time of the next activation are different (have changed) from those at the time of the last deactivation, the DAW software can accurately determine whether the connected external remote controllers have already been registered. Further, in the case where the fourth external remote controller was connected and channels ch13 to ch16 were assigned at the time of the last deactivation and where the fourth external remote controller has been determined to be currently connected to the PC 1 at the time of the next activation, channels ch13 to ch16 are assigned to the fourth external remote controller, and in this way, the same assignment state as at the time of the last deactivation is restored.

Figure 11A:
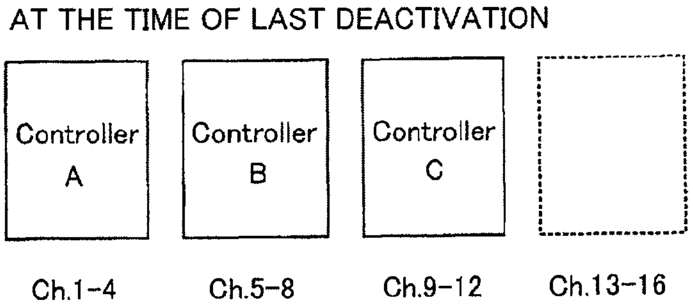
FIGS. 11A and 11B are diagrams showing another example of channel assignments of a plurality of controller devices of the present invention at the time of last deactivation and next activation of the DAW software.
Figure 11B:
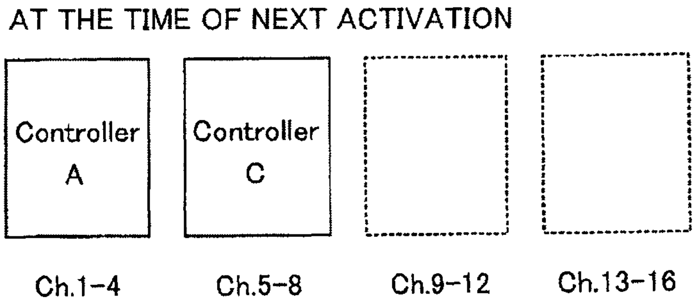

FIG. 11A shows channel assignment to external remote controllers at the time of the last deactivation of the DAW software, and FIG. 11B shows channel assignment to external remote controllers in a case where the number of external remote controllers connected to the PC 1 at the time of the next activation has decreased from that at the time of the last deactivation. Namely, at the time of the last deactivation of the DAW software shown in FIG. 11A, three external remote controllers, Controller A, Controller B and controller C, were (had been) registered in the DAW software, and channels chi to ch4 were assigned to Controller A, channels ch5 to ch8 assigned to Controller B, and channels ch9 to ch12 assigned to Controller C. Also, at the time of the deactivation, the DAW software stores the above-mentioned controller information. Then, once the thus-deactivated DAW software is activated again (i.e., upon the next activation), the DAW software identifies the controller IDs of the external remote controllers, determined to be currently connected to the PC 1, on the basis of the MAC addresses or serial numbers, such as the manufacture's serial numbers, of the external remote controllers. In the illustrated example of FIG. 11B, the controller IDs of two external remote controllers, Controller A and Controller C, are identified by the DAW software. Then, the DAW software reads out the stored controller information and determines, on the basis of the controller IDs identified upon the next activation, whether the connected external remote controllers have been registered and whether the organization of the connected external remote controllers is the same as that at the time of the last deactivation.

In the illustrated example of FIG. 11B, where Controller A and Controller C are connected to the PC 1 without Controller B being connected to the PC 1, the DAW software determines that the connected controllers have been registered, but determines that the organization of the external remote controllers is different from that at the time of the last deactivation where Controller B was connected to the PC 1. Because, in this case, only two external remote controllers are connected to the PC 1, the DAW software performs the channel assignment, considering eight channels as the number of channels constituting one bank size. Here, because the first channel in the controller information is of channel number ch1, the DAW software assigns eight channels ch1 to ch8 to Controller A and controller C logically considered as a single external remote controller provided with eight faders. Namely, channels ch1 to ch4 are assigned to Controller A, and channels ch5 to ch8 are assigned to Controller C, as shown in FIG. 11B. Then, the DAW software stores controller information reflecting therein the changed assignment state.

At the time of the next activation, the DAW software determines whether the currently connected external remote controllers are the same as those connected at the time of the last deactivation, on the basis of the controller IDs of the external remote controllers in place of the port names. Thus, even where the port names to which the external remote controllers have been connected at the time of the next activation are different (have changed) from those at the time of the last deactivation, the DAW software can accurately determine whether the connected external remote controllers have been registered. Further, in the case where the fourth external remote controller was connected and channels ch13 to ch16 were assigned at the time of the last deactivation and where the same third and fourth external remote controllers have been determined to be currently connected to the PC 1 at the time of the next activation, channels ch9 to ch12 are assigned to the third the external remote controller and channels ch13 to ch16 are assigned to the fourth external remote controller.

Figure 12A:
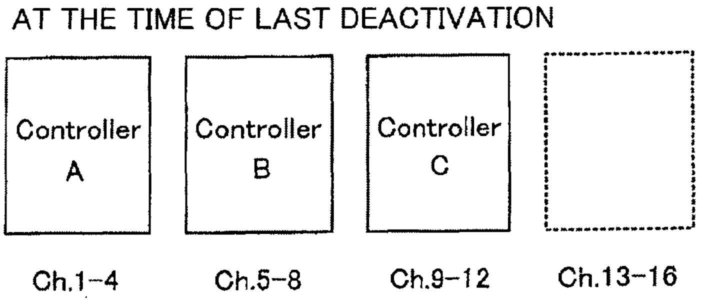
FIGS. 12A and 12B are diagrams showing still another example of channel assignments of a plurality of controller devices of the present invention at the time of last deactivation and next activation of the DAW software.
Figure 12B:
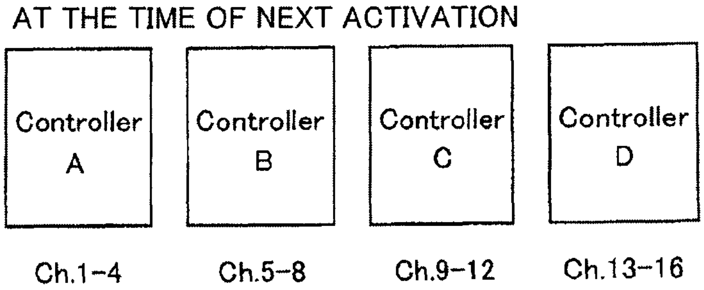

FIG. 12A shows channel assignment to external remote controllers at the time of the last deactivation of the DAW software, and FIG. 12B shows channel assignment to external remote controllers in a case where the number of external remote controllers connected to the PC 1 at the time of the next activation has increased from that at the time of the last deactivation. Namely, at the time of the last deactivation of the DAW software shown in FIG. 12A, three external remote controllers, Controller A, Controller B and Controller C, were registered in the DAW software, and channels ch1 to ch4 were assigned to Controller A, channels ch5 to ch8 assigned to Controller B, and channels ch9 to ch12 assigned to Controller C. Also, at the time of the deactivation, the DAW software stores the above-mentioned controller information. Then, once the thus-deactivated DAW software is activated again (i.e., upon the next activation), the DAW software identifies the controller IDs of the external remote controllers, determined to be currently connected to the PC 1, on the basis of the MAC addresses or serial numbers, such as the manufacture's serial numbers, of the external remote controllers. In the illustrated example of FIG. 12B, the controller IDs of three external remote controllers, Controller A, Controller B and Controller C, are identified by the DAW software, but the controller ID of the fourth external remote controller is not identified because the fourth external remote controller (Controller D) has not yet been registered. Then, the DAW software reads out the stored controller information and determines, on the basis of the controller IDs identified upon the next activation, whether the connected external remote controllers have already been registered and whether the organization of the connected external remote controllers is the same as that the time of the last deactivation.

In the illustrated example of FIG. 12B, the DAW software determines that the connected controllers, Controller A, Controller B and Controller C, have already been registered, but determines that the fourth external remote controller (Controller D) has not yet been registered. Also, the DAW software determines that the organization of the external remote controllers is different (has changed) from that at the time of the last deactivation because the fourth external remote controller (Controller D) has been newly connected. In this case, the DAW software creates controller information including the controller ID of the newly connected fourth external remote controller and registers Controller D immediately following the registered position of Controller C. Because four external remote controllers are connected to the PC 1, the DAW software performs the channel assignment, considering sixteen channels as the number of channels constituting one bank size. Here, because the first channel in the controller information is of channel number ch1, the DAW software assigns sixteen channels ch1 to ch16 to Controller A, Controller B, controller C and Controller D logically considered as a single external remote controller provided with sixteen faders. In this case, channels ch1 to ch16 are assigned with higher priority on the earlier registered external remote controllers, i.e. Controller A, Controller B and controller C. Namely, channels ch1 to ch4 are assigned to Controller A, channels ch5 to ch8 assigned to Controller B, channels ch9 to ch12 assigned to Controller C, and channels ch13 to ch16 assigned to Controller D, as shown in FIG. 12B. Then, the DAW software stores controller information reflecting therein the changed assigned state.

At the time of the next activation, the DAW software determines whether the currently connected external remote controllers are the same as those connected at the time of the last deactivation, on the basis of the controller IDs of the external remote controllers in place of the port names. Thus, even where the port names to which the external remote controllers have been connected at the time of the next activation are different (has changed) from those at the time of the last deactivation, the DAW software can accurately determine whether the connected external remote controllers have been registered. Further, in the case where the fourth external remote controller was connected and channels ch13 to ch16 were assigned at the time of the last deactivation and where the same fourth external remote controller has been determined to be currently connected to the PC 1 at the time of the next activation, channels ch13 to ch16 are assigned to the fourth the external remote controller, and in this way, the same assignment state as at the time of the last deactivation is restored.

Figure 13A:
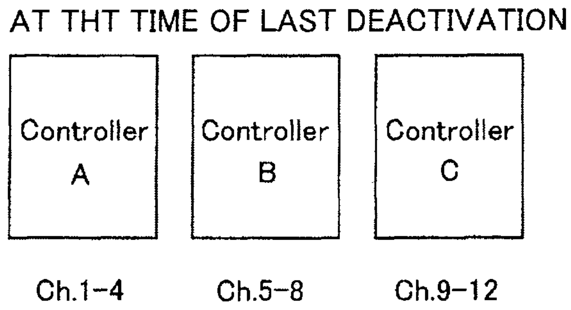
FIGS. 13A and 13B are diagrams showing still another example of channel assignments of a plurality of controller devices of the present invention at the time of last deactivation and next activation of the DAW software.
Figure 13B:
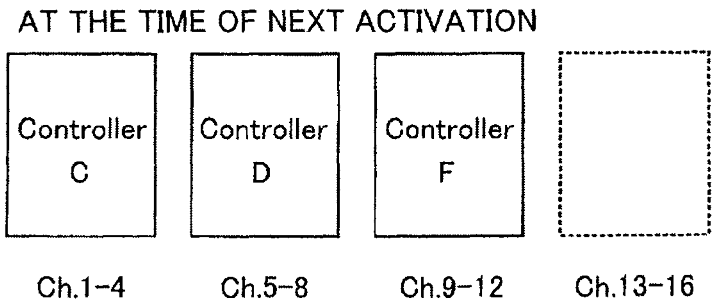

FIG. 13A shows channel assignment to external remote controllers at the time of the last deactivation of the DAW software, and FIG. 13B shows channel assignment to external remote controllers in a case where different external remote controllers from those at the time of the last deactivation have been connected at the time of the next activation. Namely, at the time of the last deactivation of the DAW software shown in FIG. 13A, three external remote controllers, Controller A, Controller B and controller C, were registered in the DAW software, and channels ch1 to ch4 were assigned to Controller A, channels ch5 to ch8 assigned to Controller B, and channels ch9 to ch12 assigned to Controller C. Also, at the time of the deactivation, the DAW software stores the above-mentioned controller information. Then, once the thus-deactivated DAW software is activated again (i.e., upon the next activation), the DAW software identifies the controller IDs of the external remote controllers, determined to be currently connected to the PC 1, on the basis of the MAC addresses or serial numbers, such as the manufacture's serial numbers, of the external remote controllers. In the illustrated example of FIG. 13B, the controller ID of Controller C is identified by the DAW software, but the controllers ID of newly connected external remote controllers (second and third connected controllers in FIG. 13B, i.e. Controller D and Controller F) are not identified because the newly connected external remote controllers, Controller D and Controller F, have not yet been registered. Then, the DAW software reads out the stored controller information and determines, on the basis of the controller ID identified upon the next activation, whether the connected external remote controllers have been registered and whether the organization of the connected external remote controllers is the same as that at the time of the last deactivation.

In the illustrated example of FIG. 13B, the DAW software determines that Controller C currently connected to the DAW software has been registered, but determines that the newly connected external remote controllers, Controller D and Controller F, have not yet been registered. Also, the DAW software determines that the organization of the external remote controllers is different from that at the time of the last deactivation because (Controller D and Controller F) have been newly connected. In this case, the DAW software creates controller information including the controller IDs of the newly connected external remote controllers, i.e. Controller D and Controller F, and newly registers Controller D and Controller F in the order mentioned here. Because three external remote controllers are currently connected to the PC 1, the DAW software performs the channel assignment, considering twelve channels as the number of channels constituting one bank size. Here, because the first channel in the controller information is of channel number ch1, the DAW software assigns twelve channels ch1 to ch12 to Controller C, Controller D and Controller F logically considered as a single external remote controller provided with twelve faders. In this case, channels ch1 to ch12 are assigned with higher priority on the earlier registered external remote controller. Namely, channels ch1 to ch4 are assigned to Controller C, channels ch5 to ch8 assigned to Controller D, and channels ch9 to ch12 assigned to Controller F, as shown in FIG. 13B. Then, the DAW software stores controller information reflecting therein the changed assignment state. If another new remote controller (i.e., fourth remote controller) has been connected to the PC 1 at the time of the next activation, channels ch13 to ch16 are assigned to the fourth remote controller.

At the time of the next activation, the DAW software determines whether the currently connected external remote controllers are the same as those connected at the time of the last deactivation, on the basis of the controller IDs of the external remote controllers in place of the port names. Thus, even where the port names to which the external remote controllers have been connected at the time of the next activation are different (has changed) from those at the time of the last deactivation, the DAW software can accurately determine whether the connected external remote controllers have been registered.

Further, in the above-described embodiment, the personal computer (PC) 1 having the DAW software installed therein includes a control section for controlling the assignment, storage of assigned results, etc. as described above with reference to FIGS. 6 to 13B; namely, application software for implementing the functions of the control section is incorporated in the PC 1. However, the present invention is not so limited, and another computer in the system may perform the functions of the control section. Alternatively, a control section for controlling the assignment, storage of assigned results, etc. as described above with reference to FIGS. 6 to 13B may be included in each of the external remote controllers (controller devices) 2 and 3; namely, the application software for implementing the functions of the control section may be incorporated in each of the external remote controllers (controller devices) 2 and 3.

In each of the above-described controller devices of the present invention, the controller information indicative of an assignment state of channels to the controller devices at the time of the last deactivation of the DAW software is automatically stored, and channels are assigned to the controller devices at the time of the next activation (following the last deactivation) on the basis of the stored controller information. Thus, the present invention permits a seamless connection between the controller devices and the DAW software without the user caring about connecting and setting states of the controller devices. In this way, if only a desired controller device is physically connected to the DAW software, the controller device can be used in the same states as at the time of the last deactivation of the DAW software. In this case, even where the number of the controller devices connected to the DAW software is different from that at the time of the last deactivation of the DAW software, the first channel to be assigned is the same as at the time of the last deactivation. Further, if the number of the controller devices connected to the DAW software has decreased, the channels to be assigned is decreased, while, if the number of the controller devices connected to the DAW software has increased, the number of the channels to be assigned is increased. Also, the present invention can eliminate a need for resetting logical connection states in accordance with physical connection states.

Whereas the preceding paragraphs have described the controller device of the present invention as limited to a fader unit, the present invention may be practiced as a controller device for remote-controlling parameters of audio processing functions, such as recording and reproduction, effect impartment, mixing etc. of audio signals. Further, whereas the controller device of the present invention has been described as connected to a computer via a USB-based scheme, the scheme for physically connecting the controller device to the computer is not limited to the USB-based scheme and may be one using any other suitable communication interface. Furthermore, the maximum number of controller devices connectable to the computer is not necessarily limited to four and may be more than four.

This application is based on, and claims priority to, JP PA 2011-069816 filed on 28 Mar. 2011. The disclosure of the priority application, in its entirety, including the drawings, claims, and the specification thereof, are incorporated herein by reference.

What is claimed is:

1. A system including at least one controller device connectable to a computer where a mixer function is implemented by application software, each said controller device comprising:

a communication interface connectable to the computer;

a plurality of faders each capable of remote-controlling a parameter of one of a plurality of channels assigned thereto, the plurality of channels having consecutive channel numbers;

a channel shift button operable to give an instruction for collectively shifting, by one channel, the channels assigned to the plurality of faders; and a bank shift button operable to give an instruction for collectively shifting, by one bank, the channels assigned to the plurality of faders, the one bank comprising a number of channels equal to a total number of the plurality of faders, said system comprising a control section which, upon activation of the application software, assigns channels, which are to be mixed by a mixer function, to the plurality of faders in ascending order of channel numbers starting with a predetermined first channel number, and which collectively shifts, by one channel, the channels assigned to the plurality of faders in response to the instruction given via the channel shift button or collectively shifts, by the one bank, the channels assigned to the plurality of faders in response to the instruction given via the bank shift button, wherein, when a plurality of the controller devices are connected to the computer, said control section not only assigns the channels to the faders, considering that a single controller device provided with a given number of faders, equal to a product between a total number of the controller devices connected to the computer and a total number of the faders provided in each of the controller devices, is connected to the computer, but also stores controller information including respective identification information of the controller devices connected to the computer and information indicative of a predetermined first channel of all of the channels assigned to the faders.

2. The system as claimed in claim 1, wherein, when the channels assigned to the plurality of faders are to be collectively shifted by the one bank, in response to the instruction given via the bank shift button, beyond a smallest or greatest channel number among the channel numbers of the assigned channels, said control section stops shifting the channels once the smallest or greatest channel number is reached.

3. The system as claimed in claim 1, wherein, upon next activation of the application software following last deactivation of the application software, said control section reads out the stored controller information, and wherein, when said control section determines, on the basis of the identification information of the read-out controller information, that organization of said controller devices connected to the computer is same between at a time of the last deactivation and at a time of the next activation of the application software, an assignment state of the channels that had been assigned to the faders at the time of the last deactivation is restored at the time of the next activation.

4. The system as claimed in claim 3, wherein, when said control section determines that the organization of said controller devices connected to the computer at the time of the next activation is different from that at the time of the last deactivation, said control section assigns the channels, in the ascending order of the channel numbers starting with the predetermined first channel number included in the controller information, to the controller devices with higher priority on the controller devices that had previously been connected to the computer at the time of the last deactivation, and wherein, if there is any controller device newly connected to the computer at the time of the next activation, said control section assigns, to the newly connected controller device, channels of ascending channels numbers following the channel numbers of the channels already assigned to the previously connected controller devices.

5. The system as claimed in claim 1, wherein said control section is included in said computer where the mixer function is implemented by the application software, or included in another computer within said system.

6. The system as claimed in claim 1, wherein a function of said control section is implemented by application software installed in said computer where the mixer function is implemented by the application software, or installed in another computer within said system.

7. The system as claimed in claim 1, wherein said control section is included in said at least one controller.

8. A computer-implemented method for assisting at least one controller device connectable to a computer system where a mixer function is implemented by application software, each said controller device comprising:

a communication interface connectable to the computer system;

a plurality of faders each capable of remote-controlling a parameter of one of a plurality of channels assigned thereto, the plurality of channels having consecutive channel numbers;

a channel shift button operable to give an instruction for collectively shifting, by one channel, the channels assigned to the plurality of faders; and a bank shift button operable to give an instruction for collectively shifting, by one bank, the channels assigned to the plurality of faders, the one bank comprising a number of channels equal to a total number of the plurality of fader, said method comprising:

an assignment step of, upon activation of the application software, assigning channels, which are to be mixed by a mixer function, to the plurality of faders in ascending order of channel numbers starting with a predetermined first channel number; and a step of collectively shifting, by one channel, the channels assigned to the plurality of faders in response to the instruction given via the channel shift button, or collectively shifting, by the one bank, the channels assigned to the plurality of faders in response to the instruction given via the bank shift button, wherein, when a plurality of the controller devices are connected to the computer system, said assignment step not only assigns the channels to the faders, considering that a single controller device provided with a given number of faders, equal to a product between a total number of the controller devices connected to the computer system and a total number of the faders provided in each of the controller devices, is connected to the computer, but also stores controller information including respective identification information of the controller devices connected to the computer system and information indicative of a predetermined first channel of all of the channels assigned to the faders.

9. A computer-readable non-transient storage medium containing a group of instructions for causing a processor to perform a method for assisting at least one controller device connectable to a computer system where a mixer function is implemented by application software, each said controller device comprising:

a communication interface connectable to the computer system;

a plurality of faders each capable of remote-controlling a parameter of one of a plurality of channels assigned thereto, the plurality of channels having consecutive channel numbers;

a channel shift button operable to give an instruction for collectively shifting, by one channel, the channels assigned to the plurality of faders; and a bank shift button operable to give an instruction for collectively shifting, by one bank, the channels assigned to the plurality of faders, the one bank comprising a number of channels equal to a total number of the plurality of fader, said method comprising:

an assignment step of, upon activation of the application software, assigning channels, which are to be mixed by a mixer function, to the plurality of faders in ascending order of channel numbers starting with a predetermined first channel number; and a step of collectively shifting, by one channel, the channels assigned to the plurality of faders in response to the instruction given via the channel shift button, or collectively shifting, by the one bank, the channels assigned to the plurality of faders in response to the instruction given via the bank shift button, wherein, when a plurality of the controller devices are connected to the computer system, said assignment step not only assigns the channels to the faders, considering that a single controller device provided with a given number of faders, equal to a product between a total number of the controller devices connected to the computer system and a total number of the faders provided in each of the controller devices, is connected to the computer, but also stores controller information including respective identification information of the controller devices connected to the computer system and information indicative of a predetermined first channel of all of the channels assigned to the faders.

10. A controller device connectable to a computer where a mixer function is implemented by application software, said controller device comprising:

a control section;

a communication interface connectable to the computer;

a plurality of faders each capable of remote-controlling a parameter of one of a plurality of channels assigned thereto, the plurality of channels having consecutive channel numbers;

a channel shift button operable to give an instruction for collectively shifting, by one channel, the channels assigned to the plurality of faders; and a bank shift button operable to give an instruction for collectively shifting, by one bank, the channels assigned to the plurality of faders, the one bank comprising a number of channels equal to a total number of the plurality of faders, wherein, upon activation of the application software, channels to be mixed by a mixer function are assigned to the plurality of faders in ascending order of channel numbers starting with a predetermined first channel number, and wherein the channels assigned to the plurality of faders are collectively shifted by one channel in response to the instruction given via the channel shift button, or collectively shifted by the one bank in response to the instruction given via the bank shift button, and wherein, when a plurality of the controller devices are connected to the computer, said control section not only assigns the channels to the faders, considering that a single controller device provided with a given number of faders, equal to a product between a total number of the controller devices connected to the computer and a total number of the faders provided in each of the controller devices, is connected to the computer, but also stores controller information including respective identification information of the controller devices connected to the computer and information indicative of a predetermined first channel of all of the channels assigned to the faders.

* * * * *